United States Patent
Lin et al.

(10) Patent No.: US 9,292,781 B2
(45) Date of Patent: Mar. 22, 2016

(54) INSTALLATION CARD FOR SMART OVERLAY AND INSTALLATION METHOD USING THE SAME

(71) Applicant: MXTRAN INC., Hsin Chu (TW)

(72) Inventors: Chin-Sheng Lin, Zhubei (TW); Cheng-Chia Kuo, Hsinchu (TW); Chih-Cheng Lin, Hsinchu (TW)

(73) Assignee: MXTRAN INC., Hsin Chu (TW)

( * ) Notice: Subject to any disclaimer, the term of this patent is extended or adjusted under 35 U.S.C. 154(b) by 0 days.

(21) Appl. No.: 14/225,517

(22) Filed: Mar. 26, 2014

(65) Prior Publication Data
US 2015/0186767 A1 Jul. 2, 2015

(30) Foreign Application Priority Data

Dec. 31, 2013 (TW) .............................. 102149391 A

(51) Int. Cl.
*G06K 19/077* (2006.01)
(52) U.S. Cl.
CPC .... *G06K 19/07722* (2013.01); *G06K 19/07737* (2013.01)
(58) Field of Classification Search
CPC .............................................. G06K 19/07722
USPC ............ 235/441, 492, 488; 361/748; 257/782
See application file for complete search history.

(56) References Cited

U.S. PATENT DOCUMENTS

| | | | |
|---|---|---|---|
| 2008/0150164 A1* | 6/2008 | Chia ............................ | 257/783 |
| 2010/0259904 A1* | 10/2010 | Hsiao et al. .................. | 361/748 |
| 2011/0315779 A1* | 12/2011 | Bidin et al. .................. | 235/492 |
| 2012/0043383 A1* | 2/2012 | Liu ............................... | 235/441 |

FOREIGN PATENT DOCUMENTS

TW 200840695 10/2008

OTHER PUBLICATIONS

"Smart Cards; UICC-Terminal interface; Physical and logical characteristics"; (Release 11); ETSI TS 102 221 V11.0.0 (Jun. 2012); © European Telecommunications Standards Institute 2012; pp. 1-81.
TIPO Office Action dated Nov. 12, 2015 in corresponding Taiwan application (No. 102149391).

* cited by examiner

*Primary Examiner* — Allyson Trail
(74) *Attorney, Agent, or Firm* — McClure, Qualey & Rodack, LLP

(57) ABSTRACT

An installation card for a smart SIM Overlay and an installation method using the same are provided. The installation card comprises a carrier plate, a first adhesive layer, a smart overlay and a second adhesive layer. The carrier plate has a notch and a surface. The first adhesive layer adheres to the surface of the carrier plate. The smart overlay is adheres to the first adhesive layer, and the smart overlay is positioned corresponding to the notch. The second adhesive layer is adhered to the smart overlay.

20 Claims, 12 Drawing Sheets

INSTALLATION CARD FOR SMART OVERLAY AND INSTALLATION METHOD USING THE SAME

This application claims the benefit of Taiwan application Serial No. 102149391, filed Dec. 31, 2013, the subject matter of which is incorporated herein by reference.

BACKGROUND

1. Technical Field

The disclosure relates in general to an installation card for a smart overlay and an installation method using the same and more particularly to an installation card having a notch for a smart overlay and an installation method using the same.

2. Description of the Related Art

Mobile payment has developed for several years, and transaction using cell phone is a future tendency. One of ways to add a function of mobile payment in cell phone is to replace the entire subscriber identity module (SIM) card. However, such way requires to considerably modify software and hardware of the SIM card, causing waste of time and cost.

SUMMARY

The disclosure is directed to an installation card for a smart overlay and an installation method using the same, in one embodiment, the problem of considerably modifying software and hardware of SIM card may be improved or resolved.

One aspect of the disclosure relates to an installation card for a smart overlay. In one embodiment, the installation card comprises a carrier plate, a first adhesive layer, a smart overlay and a second adhesive layer. The carrier plate has a notch. The first adhesive layer is adhered to the carrier plate. The smart overlay is adhered to the first adhesive layer and positioned corresponding to the notch. The second adhesive layer is adhered to the smart overlay.

Another aspect of the disclosure relates to an installation method for a smart overlay. The installation method comprises the following steps. An installation card is provided, wherein the installation card comprises a carrier plate, a first adhesive layer, a smart overlay and a second adhesive layer, the carrier plate has a notch, the first adhesive layer is adhered to the carrier plate, the smart overlay is adhered to the first adhesive layer and positioned corresponding to the notch, and the second adhesive layer is adhered to the smart overlay; a Subscriber Identity Module (SIM) card is adhered to the smart overlay; and the first adhesive layer and the smart overlay are separated.

The following description is made with reference to the accompanying drawings.

DETAILED DESCRIPTION

Figure 1A:
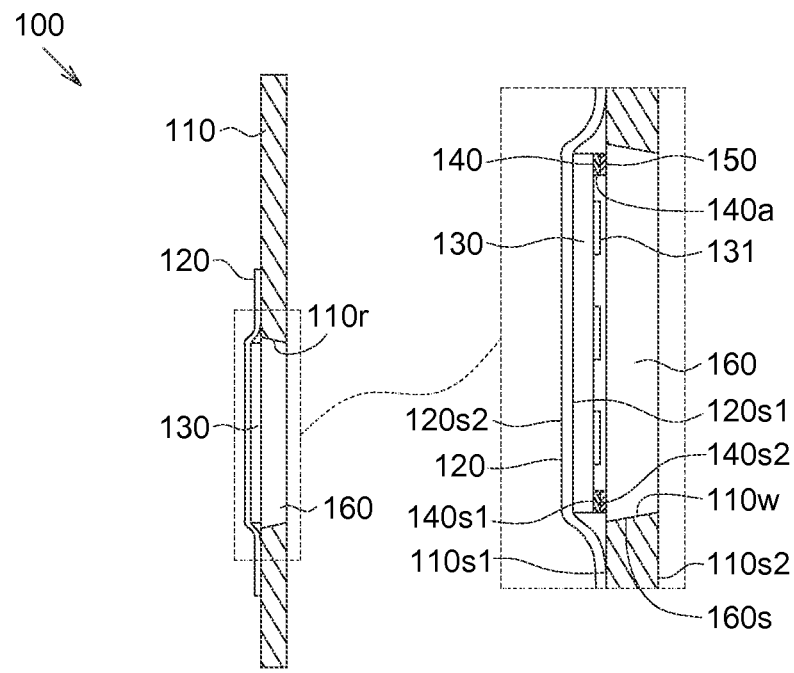
FIG. 1A illustrates a cross-section view of an installation card for a smart overlay according to an embodiment of the invention.
Figure 1B:
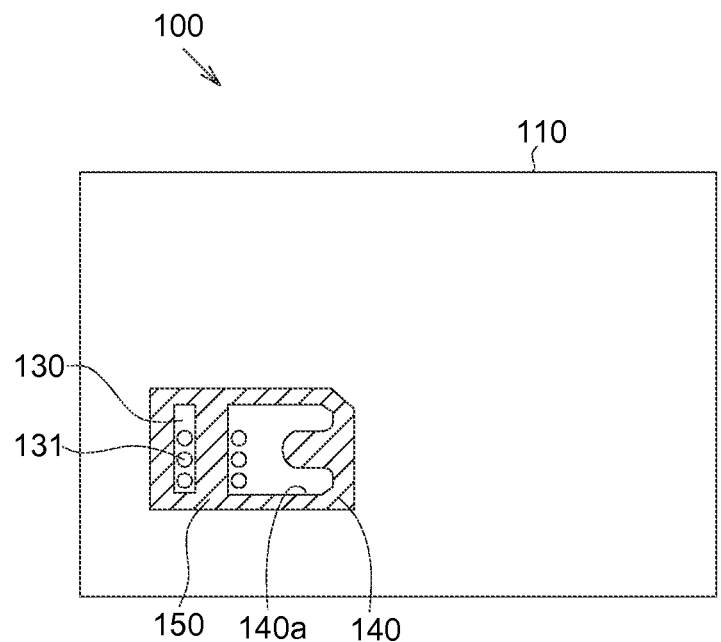
FIG. 1B (a cover plate is not illustrated) illustrates a side view of FIG.

FIG. 1A illustrates a cross-section view of an installation card for a smart overlay according to an embodiment of the invention, and FIG. 1B (a cover plate is not illustrated) illustrates a side view of FIG. 1A. The installation card 100 comprises a carrier plate 110, a first adhesive layer 120, a smart overlay 130, a second adhesive layer 140, a release film 150 and a cover plate 160.

The carrier plate 110 has a notch 110$r$, a first surface 110$s$1 and a second surface 110$s$2 opposite to the first surface 110$s$1. In the present embodiment, the notch 110$r$ is a through hole. In such case, the smart overlay 130 may be exposed from the notch 110$r$ when the cover plate 160 and the carrier plate 110 are separated, such that a SIM card may be installed in the smart overlay 130 through the notch 110$r$.

The first adhesive layer 120 is adhered to the first surface 110$s$1 of the carrier plate 110, such that the smart overlay 130 is adhered to the carrier plate 110 through the first adhesive layer 120, and thus the smart overlay 130 is not easy to be detached from the carrier plate 110. The first adhesive layer 120 is transparent adhesive layer, for example, and has a first surface 120$s$1 and a second surface 120$s$2, wherein the first surface 120$s$1 has adhesive and is adhered to the carrier plate 110 and the smart overlay 130, and the second surface 120$s$2 may has no adhesive. In addition, the first adhesive layer 120 is a static paste, for example, and thus a static to destroy the smart overlay 130 may be avoided.

The smart overlay 130 may be combined with the SIM card for being applying to mobile payment, transaction with bank, communication, etc. The smart overlay 130 is adhered to the first adhesive layer 120, and the smart overlay 130 is positioned corresponding to the notch 110$r$. The smart overlay 130 is adhered to the carrier plate 110 through the first adhesive layer 120 for fixing a relative position between the smart overlay 130 and the notch 110$r$. Accordingly, during the SIM card being installed in the smart overlay 130, an alignment accuracy of relative position between the SIM card and the smart overlay 130 may be increased. In the present embodiment, a specification size of the smart overlay 130 substantially conforms to a size of notch 110$r$. In detail, an area of the smart overlay 130 and an area of an opening of the notch 110$r$ are substantially the same, and a shape of the smart overlay 130 and a shape of the notch 110$r$ are similar. In another embodiment, the specification size of the smart overlay 130 is less than the specification size of the notch 110*r*. In the present embodiment, the specification size of the smart overlay 130 conforms to a specification size of Normal SIM having an area of 2.5 cm×1.5 cm. In another embodiment, the specification size of the smart overlay 130 conforms to a specification size of Micro SIM having an area of 1.5 cm×1.2 cm or a specification size of Nano SIM having an area of 1.22 cm×0.88 cm. In terms of area, the area of Normal specification is larger than the area of Micro specification, and the area of Micro specification is larger than that of Nano specification.

The smart overlay 130 may be installed in the SIM card having the same size or a larger size. In detail, when the specification size of the smart overlay 130 conforms to Normal specification, the smart overlay 130 may be installed in the SIM card conforming to Normal specification; when the specification size of the smart overlay 130 conforms to Micro specification, the smart overlay 130 may be installed in the SIM card conforming to Normal specification or Micro specification; when the specification size of the smart overlay 130 conforms to Nano specification, the smart overlay 130 may be installed in the SIM card conforming to Normal specification, Micro specification or Nano specification.

The second adhesive layer 140 is adhered to the smart overlay 130. For example, the second adhesive layer 140 is a double side adhesive (DSA). A first adhesive surface 140*s*1 of the second adhesive layer 140 is adhered to the smart overlay 130, and the release film 150 is adhered to a second adhesive surface 140*s*2 of the second adhesive layer 140 to prevent the second adhesive surface 140*s*2 from being polluted. In the present embodiment, a geometry shape of the release film 150 substantially conforms to a geometry shape of the second adhesive layer 140. The smart overlay 130 comprises a plurality of conductive contacts 131, and the second adhesive layer 140 has a hollow portion 140*a* to expose the conductive contacts 131 of the smart overlay 130. The number of the conductive contacts 131, such as six or eight, may be same as the number of several conductive contacts of the SIM card; however, such embodiment is not meant to be limiting.

The size of the cover plate 160 conforms to the size of the notch 110*r*, such that the cover plate 160 is stuffed into the notch 110*r*. Since the cover plate 160 is stuffed into the notch 110*r*, the smart overlay 130 is located outside the notch 110*r*. In another embodiment, a portion of the smart overlay 130 is located within the notch 110*r*, such that a portion of the cover plate 160 is located within the notch 110*r*, and another portion of the cover plate 160 is located outside the notch 110*r*. Since the notch 110*r* is a through hole, and the smart overlay 130 is positioned corresponding to the notch 110*r*, the conductive contacts 131 of the smart overlay 130 may be exposed from the notch 110*r* when the cover plate 160 and the carrier plate 110 are separated, such that SIM card is disposed on the exposed conductive contacts 131 of the smart overlay 130 through the notch 110*r* for electrically connecting the smart overlay 130. In addition, the cover plate 160 and the carrier plate 110 may be formed by pressing a plate.

In the present embodiment, the notch 110*r* is a tapered hole, and the cover plate 160 is a tapered plate. Accordingly, the cover plate 160 is engaged with the notch 110*r* through tapers of the notch 110*r* and the cover plate 160. In addition, due to the tapers, the cover plate 160 is prevented from dropping toward the second surface 110*s*2 from the first surface 110*s*1. Since the cover plate 160 is engaged with the notch 110*r* through tapers of the notch 110*r* and the cover plate 160, the cover plate 160 may be prevented from dropping from the first surface 110*s*1. A sidewall 110*w* of the notch 110*r* is inwardly extended from the first surface 110*s*1 toward the second surface 110*s*2, such that the notch 110*r* forms the tapered hole. The cover plate 160 has an inclined side 160*s* matching the sidewall 110*w* of the notch 110*r*, such that the cover plate 160 forms the tapered plate. In another embodiment, the sidewall 110*w* of the notch 110*r* is outwardly extended from the first surface 110*s*1 toward the second surface 110*s*2, and a profile of the inclined side 160*s* of the cover plate 160 may be designed as a profile corresponding to the sidewall 110*w*.

FIGS. 2A-2E illustrates an installation process of a SIM card 10 being installed in the smart overlay 130 of the installation card 100 of FIG. 1A.

Figure 2A:
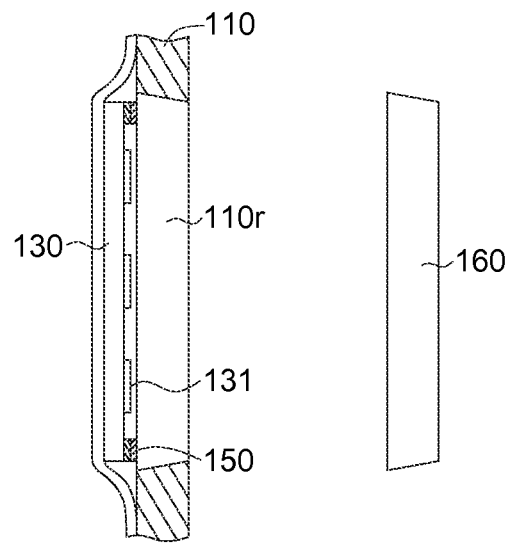
FIGS. 2A-2E illustrate an installation process of a SIM card being installed in the smart overlay of the installation card of FIG. 1A.

In FIG. 2A, the smart overlay 130 and the cover plate 160 are separated. In detail, since the carrier plate 110 has flexibility, the cover plate 160 may be pushed out through bending the carrier plate 110, such that the cover plate 160 and the carrier plate 110 are separated. After the cover plate 160 and the carrier plate 110 are separated, the conductive contacts 131 of the smart overlay 130 may be exposed from the notch 110*r*.

Figure 2B:
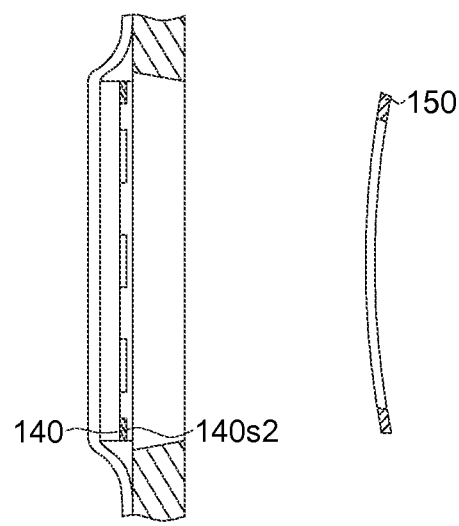

In FIG. 2B, the release film 150 and the second adhesive layer 140 are separated to expose the second adhesive surface 140*s*2 of the second adhesive layer 140, such that the SIM card 10 (illustrated in FIG. 2C) may be adhered to the second adhesive surface 140*s*2.

Figure 2C:
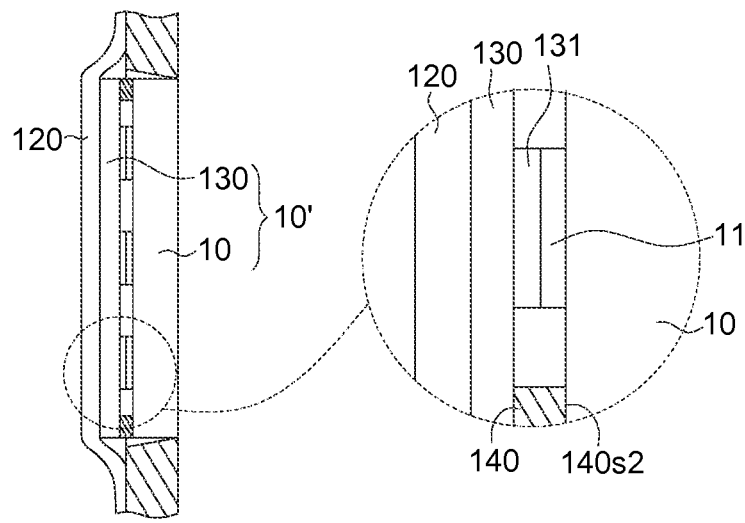

In FIG. 2C, the SIM card 10 is adhered to the second adhesive surface 140*s*2 of the second adhesive layer 140, such that the SIM card 10 is installed in the smart overlay 130. The SIM card 10 comprises a plurality of conductive contacts 11, and the conductive contacts 11 contact the conductive contact 131 of the smart overlay 130 for electrically connecting the smart overlay 130. Since the relative position between the smart overlay 130 and the notch 110*r* is fixed through the first adhesive layer 120, such that during the SIM card 10 being installing in the smart overlay 130, the alignment accuracy of relative position between the SIM card 10 and the smart overlay 130 may be increased through the notch 110*r*.

After being installed, the smart overlay 130 and the SIM card 10 form a smart SIM card 10'. In the present embodiment, the specification size of the smart overlay 130 and the specification size of the SIM card 10 conform to Normal specification. In another embodiment, the specification size of the smart overlay 130 may conform to the specification size of Micro specification. In such design, since the specification size of Micro is less than the specification size of Normal, and thus the specification size of SIM card 10 may conform to Normal specification or Micro specification, such that the smart overlay 130 may be installed in the SIM card 10. In another embodiment, the specification size of the smart overlay 130 conforms to Nano specification. In such design, since the specification size of Nano is less than the specification size of Normal and the specification size of Micro, and thus the specification size of SIM card 10 may conform to Normal specification, Micro specification or Nano specification, such that the smart overlay 130 may be installed in the SIM card 10.

Figure 2D:
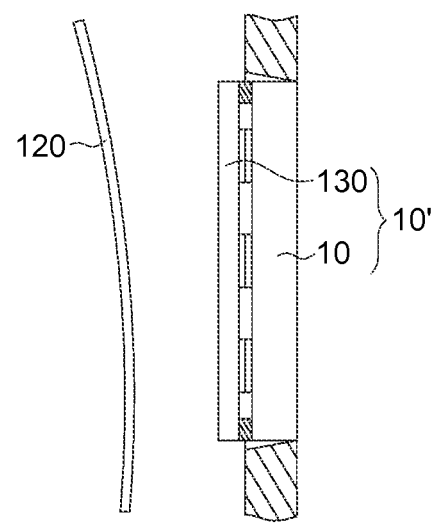

In FIG. 2D, the smart SIM card 10' and the first adhesive layer 120 are separated, such that the smart SIM card 10' is not connected with the carrier plate 110, and thus the smart SIM card 10' and the carrier plate 110 are in a detachable status.

Figure 2E:
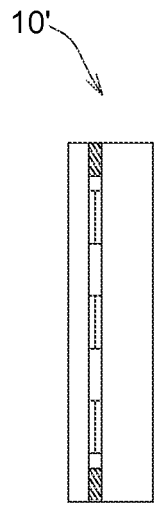

In FIG. 2E, the smart overlay 130 and the carrier plate 110 are separated to take out the smart SIM card 10'. Then, the smart SIM card 10' of FIG. 2E may be installed in a cell phone, such that the cell phone has functions of the mobile payment and the mobile communication.

Figure 3:
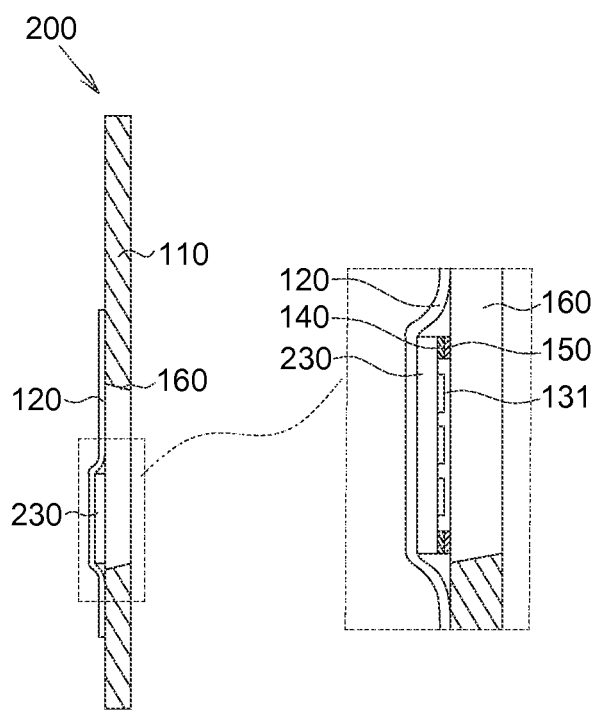
FIG. 3 illustrates a cross-section view of an installation card for a smart overlay according to another embodiment of the invention.

FIG. 3 illustrates a cross-section view of an installation card for a smart overlay according to another embodiment of the invention. The installation card 200 comprises the carrier plate 110, the first adhesive layer 120, a smart overlay 230, the second adhesive layer 140, the release film 150 and the cover plate 160. The smart overlay 230 of the present embodiment is different from the smart overlay 130 in that the specification size of the smart overlay 230 is less than the specification size of the notch 110r. In one embodiment, the smart overlay 230 conforms to Micro specification. In such design, the specification size of the SIM card 10 may conform to Normal specification or Micro specification. Alternatively, the specification size of the smart overlay 230 may conform to Nano specification. In such design, the specification size of the SIM card 10 may conform to Normal specification, Micro specification or Nano specification. The installation method of the smart overlay 230 of the installation card 200 and the SIM card is similar to that of the smart overlay 130 and the SIM card, and the similarity is not repeated.

Figure 4A:
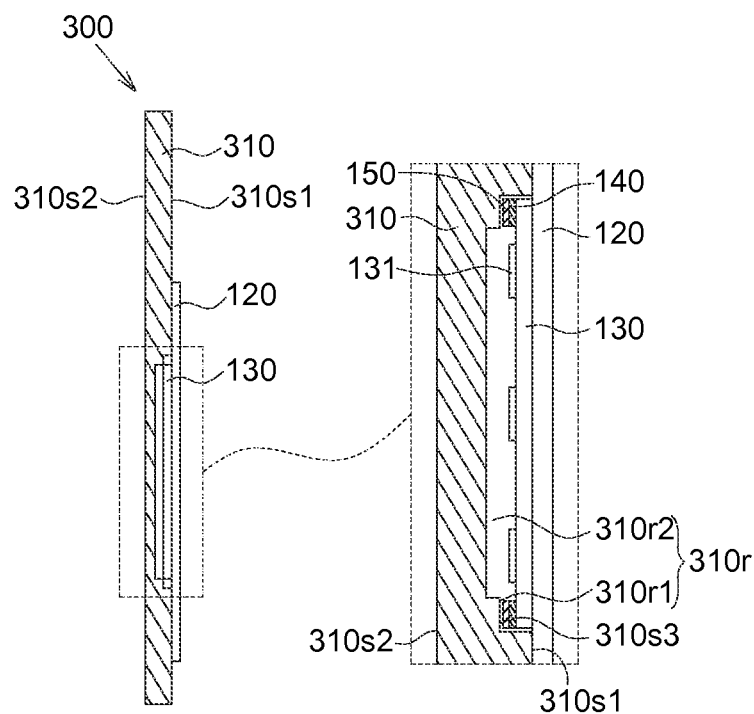
FIG. 4A illustrates a cross-section view of an installation card for a smart overlay according to another embodiment of the invention.

FIG. 4A illustrates a cross-section view of an installation card for a smart overlay according to another embodiment of the invention. The installation card 300 comprises a carrier plate 310, the first adhesive layer 120, the smart overlay 130, the second adhesive layer 140 and the release film 150. The smart overlay 130 is adhered to the carrier plate 310 through the first adhesive layer 120. The carrier plate 310 comprises a notch 310r and has a first surface 310s1 and a second surface 310s2 opposite to the first surface 310s1.

In the present embodiment, the notch 310r is a recess, and the smart overlay 130 is disposed within the recess. The notch 310r comprises a first sub-recess 310r1 and a second sub-recess 310r2. The first sub-recess 310r1 is extended from the first surface 310s1 toward the second surface 310s2 and does not pass through the carrier plate 310. The second sub-recess 310r2 is extended from a bottom surface 310s3 of the first sub-recess 310r1 toward the second surface 310s2 and does not pass through the carrier plate 310. The specification size of the smart overlay 130 conforms to a size of the first sub-recess 310r1, such that the smart overlay 130 may be located within the first sub-recess 310r1. In another embodiment, the specification size of the smart overlay 130 conforms to a size of the second sub-recess 310r2, such that the smart overlay 130 may be located within the first sub-recess 310r1 or the second sub-recess 310r2. In addition, the notch 310r may be formed by machining process, such as milling.

Figure 4B:
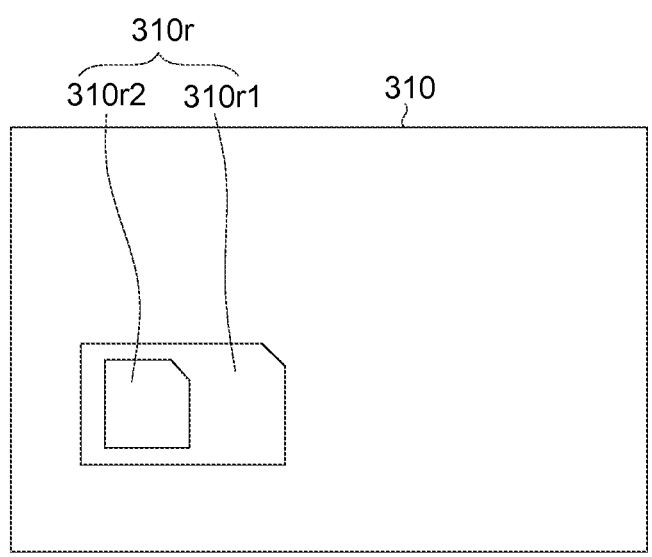
FIG. 4B illustrates a side view of FIG. 4A.

FIG. 4B illustrates a side view of FIG. 4A. As illustrated, the size of the first sub-recess 310r1 is different from the size of the second sub-recess 310r2. In the present embodiment, the size of the first sub-recess 310r1 may conform to Normal specification, and the size of the second sub-recess 310r2 may conform to Micro specification or Nano specification, such that the SIM card conforming to Normal, Micro or Nano specification may be installed in the smart overlay 130 through the first sub-recess 310r1 or the second sub-recess 310r2. In another embodiment, the size of the first sub-recess 310r1 may conform to Micro specification, and the size of the second sub-recess 310r2 may conform to Nano specification, such that the SIM card conforming to Micro or Nano specification may be installed in the smart overlay 130 through the first sub-recess 310r1 or the second sub-recess 310r2.

FIGS. 5A-5E illustrates an installation process of the SIM card 10 being installed in the smart overlay 130 of the installation card 300 of FIG. 4A.

Figure 5A:
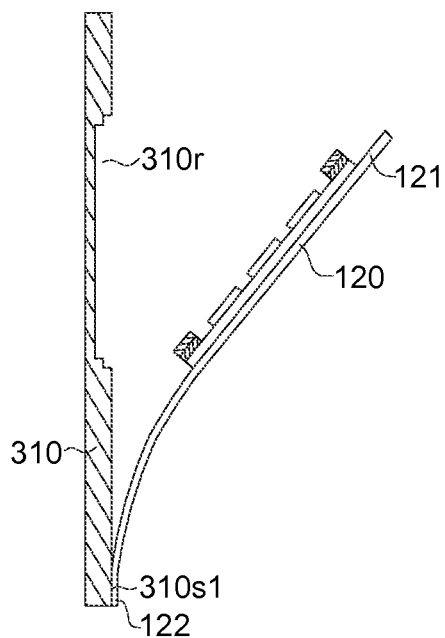
FIGS. 5A-5E illustrate an installation process of the SIM card being installed in the smart overlay of the installation card of FIG. 4A.

In FIG. 5A, a portion 121 of the first adhesive layer 120 and the carrier plate 310 are separated to expose the notch 310r by tearing off the portion 121 of the first adhesive layer 120. After the notch 310r is exposed, the SIM card 10 (illustrated in FIG. 5) may be disposed within the exposed notch 310r. After the first adhesive layer 120 is tore off, another portion 122 of the first adhesive layer 120 still keeps adhering to the first surface 310s1, such that relative position between the smart overlay 130 and the notch 310r may be maintained. Accordingly, the alignment accuracy of relative position between the smart overlay 130 and the SIM card 10 in step of FIG. 5D may be increased.

Figure 5B:
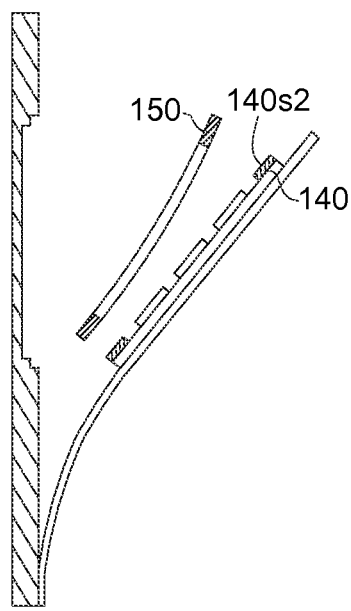

In FIG. 5B, the release film 150 and the second adhesive layer 140 are separated to expose second adhesive surface 140s2 of the second adhesive layer 140.

Figure 5C:
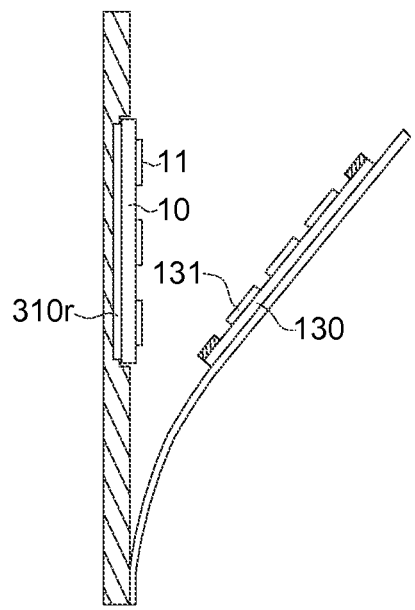

In FIG. 5C, the SIM card 10 is disposed within the notch 310r. The specification size of the SIM card 10 is larger than or substantially equal to the specification size of the smart overlay 130. In the present embodiment, the specification size of the smart overlay 130 and the specification size of the SIM card 10 both conform to the specification size of Normal specification. In another embodiment, the specification size of the smart overlay 130 may conform to Micro specification. In such design, the specification size of the SIM card 10 may conform to Normal or Micro specification. In another embodiment, the specification size of the smart overlay 130 may conform to Nano specification. In such design, the specification size of the SIM card 10 may conform to Normal, Micro or Nano specification. In addition, the SIM card 10 comprises a plurality of conductive contacts 11 facing the conductive contacts 131 of the smart overlay 130, such that the conductive contacts 11 may electrically contact the conductive contacts 131 of the smart overlay 130.

Figure 5D:
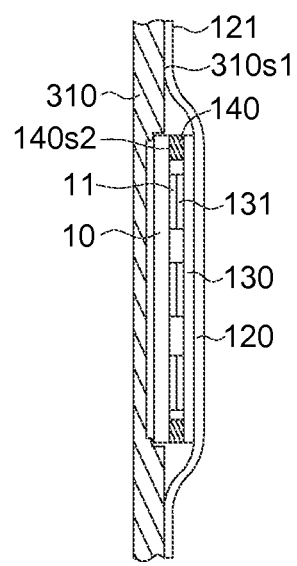

In FIG. 5D, the conductive contacts 131 of the smart overlay 130 are driven to electrically contact the conductive contacts 11 of the SIM card 10 and make the SIM card 10 be adhered to the second adhesive surface 140s2 of the second adhesive layer 140 through bonding the portion 121 of the first adhesive layer 120 back to the first surface 310s1 of the carrier plate 310.

Figure 5E:
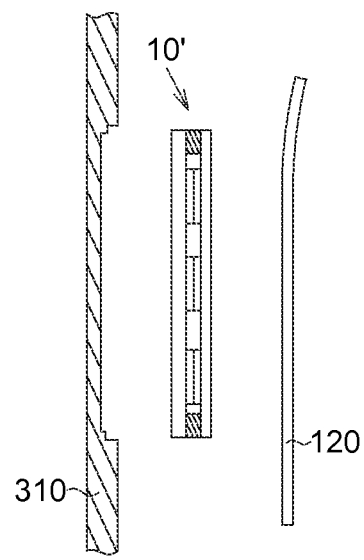

In FIG. 5E, the smart overlay 130, the carrier plate 310 and the first adhesive layer 120 are separated for taking out the smart SIM card 10'. User may install the smart SIM card 10' of FIG. 5E in a cell phone, such that the cell phone has functions of the mobile payment and the mobile communication.

Figure 6A:
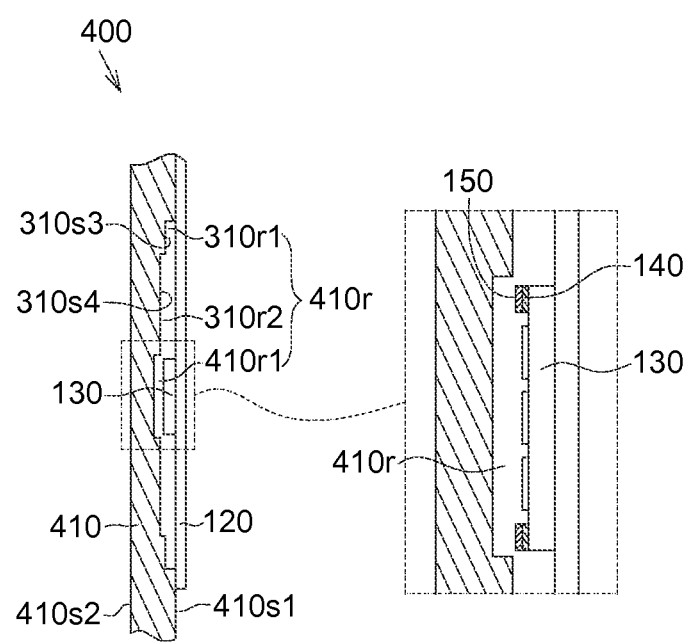
FIG. 6A illustrates a cross-section view of an installation card for a smart overlay according to another embodiment of the invention.
Figure 6B:
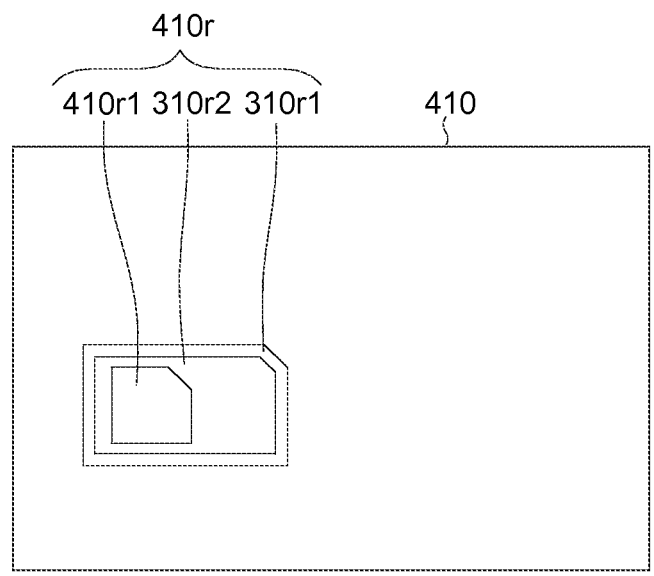
FIG. 6B illustrates a side view of FIG. 6A.

FIG. 6A illustrates a cross-section view of an installation card for a smart overlay according to another embodiment of the invention, and FIG. 6B illustrates a side view of FIG. 6A. The installation card 400 comprises a carrier plate 410, the first adhesive layer 120, the smart overlay 130, the second adhesive layer 140 and the release film 150. In the present embodiment, the carrier plate 410 has a recess 410r, a first surface 410s1 and a second surface 410s2 opposite to the first surface 410s1. The notch 410r is a recess comprising the first sub-recess 310r1, the second sub-recess 310r2 and a third sub-recess 410r1. The first sub-recess 310r1 is extended from the first surface 410s1 toward the second surface 410s2 and does not pass through the carrier plate 410. The second sub-recess 310r2 is extended from the bottom surface 310s3 of the first sub-recess 310r1 toward the second surface 410s2 and does not pass through the carrier plate 410. The third sub-recess 410r1 is extended from a bottom surface 310s4 of the second sub-recess 310r2 toward the second surface 410s2 and does not pass through the carrier plate 410. In the present embodiment, the size of the first sub-recess 310r1 may conform to Normal specification, the size of the second sub-recess 310r2 may conform to Micro specification, and the size of the third sub-recess 410r1 may conform to Nano specification.

In the present embodiment, the specification size of the smart overlay 130 may conform to Normal, Micro or Nano specification. During the SIM card being installed in the smart overlay 130 of the installation card 400, when the specification size of the smart overlay 130 conforms to Normal specification, the specification size of the SIM card 10 (not illustrated in FIG. 6A) may conform to Normal specification; in such design, the SIM card 10 may be disposed within the first sub-recess 310r1 during the installation. Alternatively, when the specification size of the smart overlay 130 conforms to Micro specification, the specification size of the SIM card 10 (not illustrated in FIG. 6A) may conform to Normal specification or Micro specification; in such design, the SIM card 10 may be disposed within the first sub-recess 310r1 (Normal specification) or the second sub-recess 310r2 (Micro specification) during the installation. Alternatively, when the specification size of the smart overlay 130 conforms to Nano specification, the specification size of the SIM card 10 (not illustrated in FIG. 6A) may conform to Normal specification, Micro specification or Nano specification; in such design, the SIM card 10 may be disposed within the first sub-recess 310r1 (Normal specification), the second sub-recess 310r2 (Micro specification) or the third sub-recess 410r1 (Nano specification) during the installation.

Figure 7:
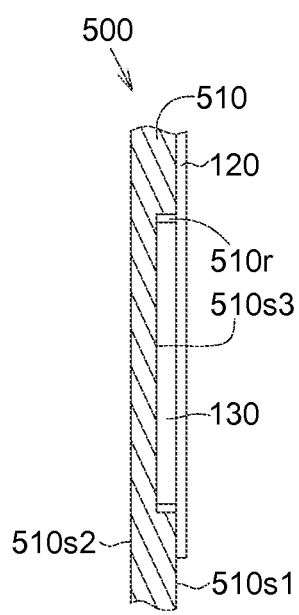
FIG. 7 illustrates a cross-section view of an installation card for a smart overlay according to another embodiment of the invention.

FIG. 7 illustrates a cross-section view of an installation card for a smart overlay according to another embodiment of the invention. The installation card 500 comprises a carrier plate 510, the first adhesive layer 120, the smart overlay 130, the second adhesive layer 140 (not illustrated) and the release film 150 (not illustrated). The carrier plate 510 has a recess 510r, a first surface 510s1 and a second surface 510s2 opposite to the first surface 510s1. In the present embodiment, the notch 510r is single recess, that is, the whole bottom surface 510s3 of the notch 510r is a coplanarity without any step structure. The notch 510r is extended from the first surface 510s1 toward the second surface 510s2 and does not pass through the carrier plate 510. In the present embodiment, since the notch 510r is single recess, the specification size of the smart overlay 130, the specification size of the notch 510r and the installed SIM card 10 may all conform to the same specification (Normal, Micro or Nano specification), such that the alignment accuracy of position between the SIM card and the smart overlay 130 may be increased.

Figure 8A:
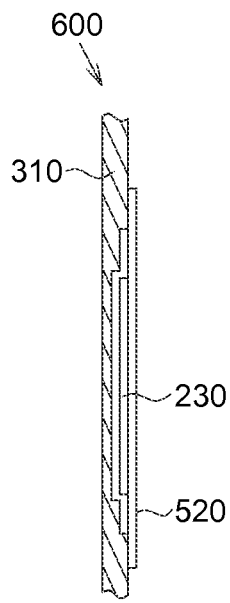
FIG. 8A illustrates a cross-section view of an installation card for a smart overlay according to another embodiment of the invention.

FIG. 8A illustrates a cross-section view of an installation card for a smart overlay according to another embodiment of the invention. The installation card 600 comprises the carrier plate 310, a first adhesive layer 520, the smart overlay 230, the second adhesive layer 140 (not illustrated) and the release film 150 (not illustrated). In another embodiment, the carrier plate 310 may be replaced by the carrier plate 110 or 220.

Figure 8B:
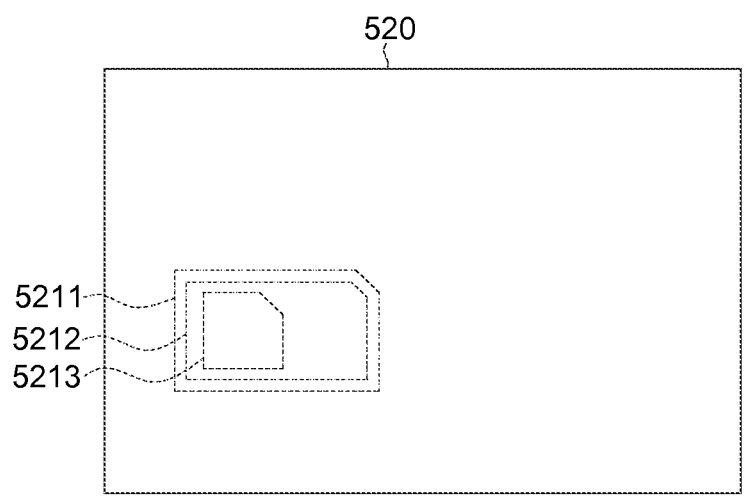
FIG. 8B illustrates a side view of FIG. 8A.

FIG. 8B illustrates a side view of FIG. 8A. The first adhesive layer 520 has a first alignment region 5211, a second alignment region 5212 and a third alignment region 5213, wherein the first alignment region 5211, the second alignment region 5212 and the third alignment region 5213 are different in size. For example, the specification size of the first alignment region 5211 conforms to Normal specification, the specification size of the second alignment region 5212 conforms to Micro specification, and the specification size of the third alignment region 5213 conforms to Nano specification. In the present embodiment, each of the first alignment region 5211, the second alignment region 5212 and the third alignment region 5213 is a dotted-line frame or solid line frame. Since the first adhesive layer 520 is transparent adhesive layer, the first alignment region 5211, the second alignment region 5212 and the third alignment region 5213 are visual from both side of the first adhesive layer 520. In another embodiment, one or two of the first alignment region 5211, the second alignment region 5212 and the third alignment region 5213 of the first adhesive layer 520 may be omitted.

In the present embodiment, the specification size of the smart overlay 230 conforms to the size of the third alignment region 5213. In another embodiment, the specification size of the smart overlay 230 may conform to the size of the first alignment region 5211 or the size of the second alignment region 5212. When the specification size of the smart overlay 230 conforms to the size of the first alignment region 5211, the smart overlay 230 may be installed in the SIM card conforming to Normal specification. When the specification size of the smart overlay 230 conforms to the size of the second alignment region 5212, the smart overlay 230 may be installed in the SIM card conforming to Normal specification or Micro specification. When the specification size of the smart overlay 230 conforms to the size of the third alignment region 5213, the smart overlay 230 may be installed in the SIM card conforming to Normal specification, Micro or Nano specification.

FIGS. 9A-9D illustrates an installation process of the SIM card 10 being installed in the smart overlay 230 of the installation card 600 of FIG. 6A.

Figure 9A:
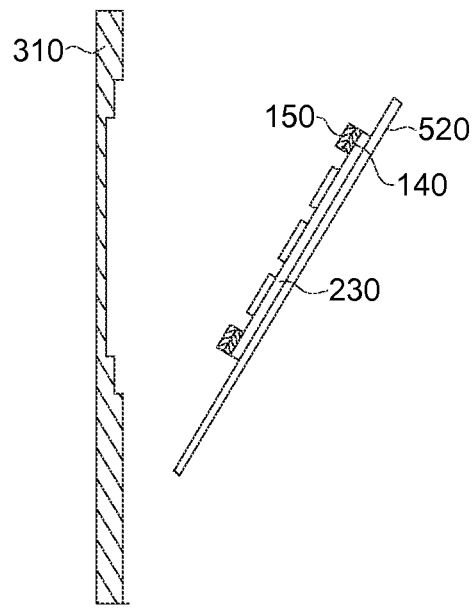
FIGS. 9A-9D illustrate an installation process of the SIM card being installed in the smart overlay of the installation card of FIG. 6A.

In FIG. 9A, the first adhesive layer 520 and the carrier plate 310 may be completely separated.

Figure 9B:
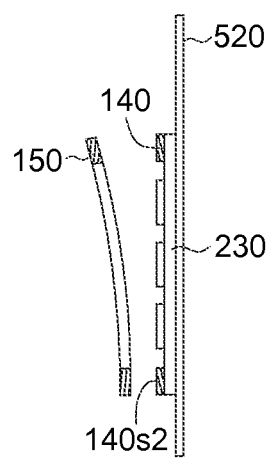

In FIG. 9B, the release film 150 and the second adhesive layer 140 are separated to expose the second adhesive surface 140s2 of the second adhesive layer 140.

Figure 9C:
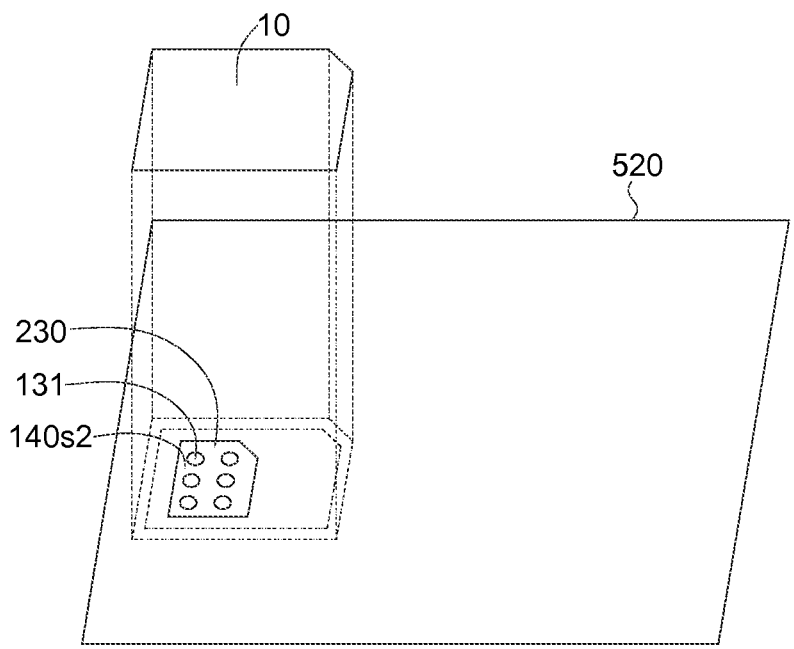

In FIG. 9C, the SIM card 10 is installed in the smart overlay 230 by aligning the first alignment region 5211. In the present embodiment, the specification size of the smart overlay 230 conforms to Nano specification. The specification size of the SIM card 10 may conform to Normal, Micro or Nano specification. In the present embodiment, the specification size of the SIM card 10 conforms to Normal specification. In another embodiment, the specification size of the smart overlay 230 may conform to Micro specification; in such design, since the smart overlay 230 may be installed in the SIM card having similar size or larger size, the specification size of the SIM card 10 may conform to Normal or Micro specification. Alternatively, the specification size of the smart 230 and the specification size of the SIM card both conform to Normal specification.

Figure 9D:
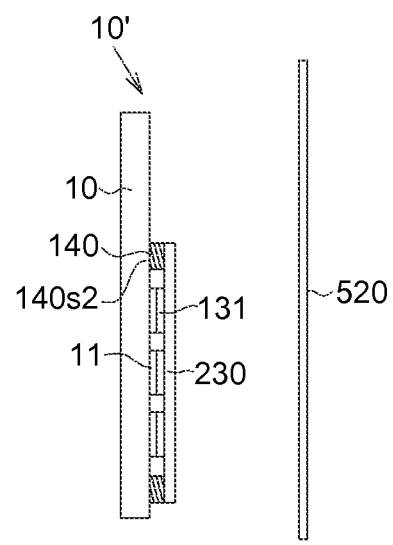

In FIG. 9D, after being installed, the SIM card 10 is adhered to the smart overlay 230 through the second adhesive layer 140, such that the SIM card 10 and the smart overlay 230 form the smart SIM card 10'. User may install the smart SIM card 10' of FIG. 9D in a cell phone, such that the cell phone has functions of the mobile payment and the mobile communication.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An installation card for a smart overlay, comprising:
a carrier plate having a notch inside the carrier plate;
a first adhesive layer adhered to the carrier plate;
a smart overlay adhered to the first adhesive layer and positioned corresponding to the notch; and
a second adhesive layer adhered to the smart overlay;
wherein a part of the second adhesive layer and a part of the first adhesive layer are on the opposite surfaces of the smart overlay respectively.

2. The installation card according to claim 1, wherein the second adhesive layer is a double side adhesive, a first adhesive surface of the double side adhesive is adhered to the smart overlay, and the smart overlay further comprising:
a release film adhered to a second adhesive surface of the double side adhesive.

3. The installation card according to claim 1, wherein the smart overlay comprises a plurality of conductive contacts, the second adhesive layer has a hollow portion, and the conductive contacts of the smart overlay are exposed from the hollow portion of the second adhesive layer.

4. The installation card according to claim 1, wherein a specification size of the smart overlay is less than or substantially equal to a size of the notch.

5. The installation card according to claim 1, wherein the notch is a through hole, and the installation card further comprises:
a cover plate engaged with the notch.

6. The installation card according to claim 5, wherein the notch is a tapered hole, and the cover plate is a tapered plate.

7. The installation card according to claim 6, wherein the carrier plate has a first surface and a second surface opposite to the first surface, the first adhesive layer is adhered to the first surface, a sidewall of the notch is inwardly extended toward the second surface from the first surface, and the cover plate has a inclined side matching the sidewall of the notch.

8. The installation card according to claim 1, wherein the notch is a recess, and the smart overlay is located within the recess.

9. The installation card according to claim 8, wherein the carrier plate has a first surface, the first adhesive layer is adhered to the first surface, the recess comprises a first sub-recess and a second sub-recess, the first sub-recess is extended from the first surface, the second sub-recess is extended from a bottom surface of the first sub-recess, and a specification size of the smart overlay conforms to a size of the first sub-recess or a size of the second sub-recess.

10. The installation card according to claim 9, wherein the recess further comprises a third sub-recess, the third sub-recess is extended from a bottom surface of the second sub-recess, and the specification size of the smart overlay conforms to the size of the first sub-recess, the size of the second sub-recess and a size of the third sub-recess.

11. The installation card according to claim 1, wherein the first adhesive layer has a first alignment region and a second alignment region, the first alignment region and the second alignment region are different in size, and a specification size of the smart overlay conforms to a size of the first alignment region or a size of the second alignment region.

12. The installation card according to claim 11, wherein the first adhesive layer further has a third alignment region, the first alignment region, the second alignment region and the third alignment region are different in size, and the specification size of the smart overlay conforms to the size of the first alignment region, the size of the second alignment region and a size of the third alignment region.

13. An installation method for a smart overlay, comprising:
providing an installation card, wherein the installation card comprises a carrier plate, a first adhesive layer, a smart overlay and a second adhesive layer, the carrier plate has a notch inside the carrier plate, the first adhesive layer is adhered to the carrier plate, the smart overlay is adhered to the first adhesive layer and positioned corresponding to the notch, the second adhesive layer is adhered to the smart overlay, and a part of the second adhesive layer and a part of the first adhesive layer are on the opposite surfaces of the smart overlay respectively;
adhering a Subscriber Identity Module (SIM) card to the smart overlay; and
separating the first adhesive layer and the smart overlay.

14. The installation method according to claim 13, wherein the second adhesive layer is a double side adhesive, a first adhesive surface of the double side adhesive is adhered to the smart overlay, and the smart overlay further comprises a release film adhered to a second adhesive surface of the double side adhesive; the installation method further comprises:
separating the release film and the second adhesive layer to exposes the second adhesive surface;
wherein in step of the SIM card being adhering to the smart overlay, the SIM card is adhered to the second adhesive surface of the second adhesive layer.

15. The installation method according to claim 13, wherein the smart overlay comprises a plurality of conductive contacts, the second adhesive layer has a hollow portion, the conductive contacts are exposed from the hollow portion of the second adhesive layer and the SIM card comprises a plurality of conductive contacts; in step of the SIM card being adhering to the smart overlay, the conductive contacts of the SIM card electrically contact the conductive contacts of the smart overlay exposed from the hollow portion.

16. The installation method according to claim 13, wherein a specification size of the smart overlay is less than or substantially equal to a size of the notch.

17. The installation method according to claim 13, wherein the notch is a through hole, and the installation card further comprises a cover plate engaged with the notch; step of the SIM card being adhering to the smart overlay further comprises:
separating the cover plate and the carrier plate, such that the smart overlay is exposed from the notch; and
disposing the SIM card within the notch, such that the SIM card is adhered to the exposed smart overlay.

18. The installation method according to claim 13, wherein the notch is a recess, and the smart overlay is located within the recess; step of the SIM card being adhering to the smart overlay comprises:
separating a portion of the first adhesive layer and the carrier plate to expose the notch;
disposing the SIM card within the exposed notch; and
bonding the portion of first adhesive layer back to the carrier plate, such that the smart overlay is adhered to the SIM card.

19. The installation method according to claim 13, wherein the first adhesive layer has a first alignment region and a second alignment region, the first alignment region and the second alignment region are different in size, and a specification size of the smart overlay conforms to a size of the first alignment region or a size of the second alignment region; step of the SIM card being adhering to the smart overlay comprises:
completely separating the first adhesive layer and the carrier plate; and
the SIM card being adhering to the smart overlay by way of the SIM card being aligned with the first alignment region or the second alignment region.

20. The installation method according to claim 13, wherein the carrier plate has a first surface, the first adhesive layer is adhered to the first surface, the notch is a recess, the recess comprises a first sub-recess and a second sub-recess, the first sub-recess is extended from the first surface, the second sub-recess is extended from a bottom surface of the first sub-recess, and a specification size of the smart overlay conforms to a size of the first sub-recess or a size of the second sub-recess.

* * * * *